Nov. 10, 1942.   A. LAEHR   2,301,885

FISHING ROD SUPPORT

Filed July 14, 1941

INVENTOR
ALEXANDER LAEHR

BY

ATTORNEYS

Patented Nov. 10, 1942

2,301,885

UNITED STATES PATENT OFFICE 2,301,885

FISHING ROD SUPPORT

Alexander Laehr, Racine, Wis.

Application July 14, 1941, Serial No. 402,334

2 Claims. (Cl. 248—42)

This invention appertains to fishing, and more particularly to a novel support or holder for a fishing rod.

One of the primary objects of my invention is to provide a device which can be quickly and conveniently attached to and removed from the gunwale or seat of a boat for detachably supporting a rod during trolling or still fishing, without the necessity of the fisherman's continuously holding the rod or pole in his hands, whereby the fisherman will be free to row the boat, etc., until a strike is had.

Another salient object of my invention is to provide a device which will effectively support a fishing rod or pole of any character, and which embodies only three main parts so constructed and arranged relative to one another that the position of the angle of the rod relative to the horizontal and to the boat can be expeditiously accomplished with two simple adjustments.

A further important object of my invention is to provide a fishing rod holder or support embodying an adjustable clamp for gripping the boat, having a laterally extending lug formed thereon, an angle bracket movable on the lug around a vertical pivot, and a cradle bracket for detachably receiving the rod movable around a horizontal pivot on the angle bracket.

A still further object of my invention is to provide a fishing rod holder of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawing, in which drawing:

Figure 1:
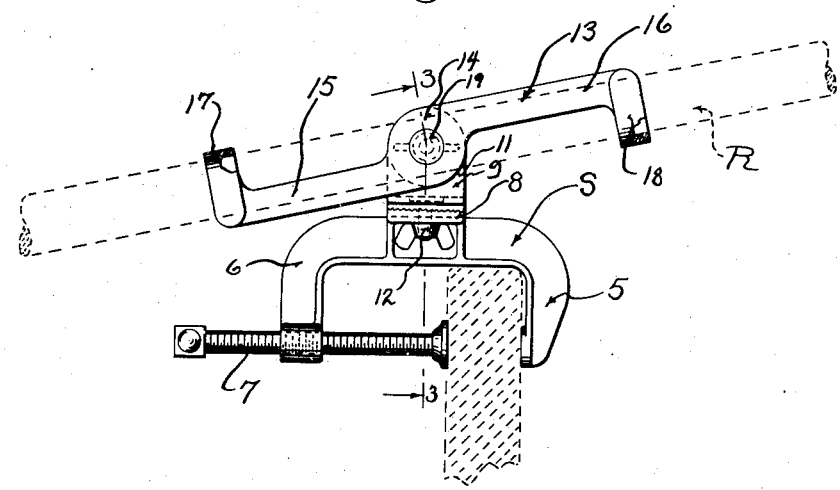
Figure 1 is a side elevational view of my improved fishing rod holder, showing the same attached to the gunwale of a boat.
Figure 2:
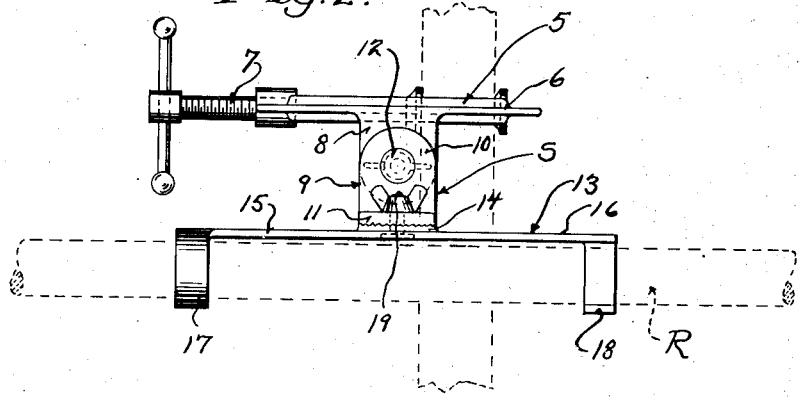
Figure 2 is a top plan view of my novel holder.
Figure 3:
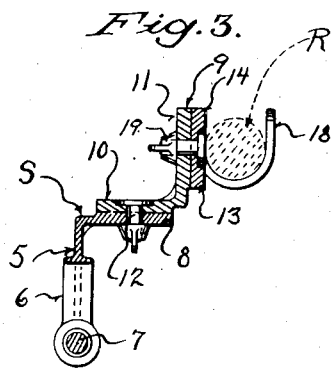
Figure 3 is a detail sectional view through the holder, taken on the line 3—3 of Figure 1, looking in the direction of the arrows.

Referring to the drawing in detail, wherein similar reference characters designate corresponding parts throughout the several views, the letter S generally indicates my novel fishing rod holder or support, and the same includes a clamp bracket 5.

The clamp bracket 5 is of a well-known character and includes a substantially C-shaped body 6. One end of this body is provided with an adjustable clamp screw 7, whereby the body can be conveniently secured to the gunwale of a boat or to the edge of a seat of a boat.

In accordance with my invention, the body 6 has formed thereon a laterally extending lug or foot 8, which is adapted to receive an angle bracket 9. This angle bracket 9 includes right-angularly extending arms 10 and 11. The arm 10 and the lug or foot 8 have formed therein registering openings for receiving a winged clamp bolt 12. The meeting faces of the arm 10 and the foot or lug 8 are provided with serrations, and these serrations radiate from the bolt openings. Obviously, these serrations permit the convenient turning of the bracket 9 on the foot or lug upon the loosening of the bolt by effectively holding the bracket in a selected adjusted position against accidental turning upon the tightening of the bolt. It is apparent that any number of the radial ribs or serrations can be formed on the arm 10 and the foot 8 as may be desired by the manufacturer.

The arm 11 of the angle bracket 9 adjustably supports the bracket cradle 13 for the fishing rod or pole. A fishing rod or pole is shown in dotted lines in the drawing and is indicated by the reference character R. The cradle bracket 13 includes a centrally disposed hub portion having formed thereon oppositely extending arms 15 and 16.

The upper edge of the arm 15 at the outer end thereof has formed thereon a downwardly curved, substantially U-shaped hook or fishing pole rest 17. The lower edge of the arm 16 at its outer end has formed thereon a similar upturned U-shaped hook or pole rest 18. Hence, the pole rests 17 and 18 extend in opposite directions.

The hub 14 and the arm 11 of the angle bracket have formed therein registering openings for the reception of a clamp bolt 19. The meeting faces of the hub 14 and the arm 11 are serrated, and these serrations or ribs extend radially from the openings and can be of any desired number. By loosening the bolt 19, the cradle bracket 13 can be swung on the bolt as a pivot to a desired adjusted angle, and when the preferred angle is attained, the bolt 19 can be tightened to firmly hold the cradle bracket in this position against accidental movement.

In use of my fishing rod holder or support S, the clamp 5 is firmly secured to a preferred part of the boat, and the bolts 12 and 19 can be loosened so as to permit the turning of the bracket 11 on the vertical pivot or bolt 12 to allow the rod to extend at a preferred angle from the boat. The bolt 12 can then be tightened. The bracket cradle 16 can be swung up or down, so that the rod itself will be held at a desired angle, and the bolt 19 can be tightened. The rod can be quickly placed in the cradle by merely placing the rod under the rest 17 and over the rest 18. This effectively holds the rod in place, and, obviously, the fisherman can devote his time and attention to rowing and the like. When a strike is made, the rod can be instantly removed from the support.

Due to the form of the rod rests 17 and 18, it can be seen that these rests can be bent to receive rods of various diameters.

From the foregoing description it can be seen that I have provided an exceptionally simple and sturdy form of fishing rod holder in which the parts are so disposed as to permit the quick and easy adjustment of the angle of the bolt relative to the horizontal and to the boat.

Changes in details may be made without departing from the spirit or the scope of my invention, but what I claim as new is:

1. A fishing rod support comprising, a clamp including a body having a laterally extending foot projecting at right-angles from said body, an angle bracket including right-angularly extending arms, one of said arms and the foot having registering openings therein, a clamp bolt extending through said registering openings for adjustably holding the bracket in a selected position, a cradle bracket for the fishing rod including a central hub portion and oppositely extending arms, the hub portion and the other arm of the angle bracket having formed therein registering openings, a clamp bolt extending through said openings for holding the cradle bracket in selected adjusted positions on the angle bracket, and oppositely extending U-shaped fishing rod rests formed on the opposite ends of said arms.

2. A fishing rod support comprising, a clamp including a body having a laterally extending foot projecting at right-angles from said body, an angle bracket including right-angularly extending arms, one of said arms and the foot having registering openings therein, a clamp bolt extending through said registering openings for adjustably holding the bracket in a selected position, a cradle bracket for the fishing rod including a central hub portion and oppositely extending arms, the hub portion and the other arms of the angle bracket having formed therein registering openings, a clamp bolt extending through said openings for holding the cradle bracket in selected adjusted positions on the angle bracket, and oppositely extending U-shaped fishing rod rests formed on the opposite ends of said arms, the meeting faces of the angle bracket, the hub portion, and the foot being provided with mating serrations.

ALEXANDER LAEHR.